US009061622B2

(12) United States Patent
Knox

(10) Patent No.: US 9,061,622 B2
(45) Date of Patent: Jun. 23, 2015

(54) STRAP TENSIONING SYSTEM

(71) Applicant: Ancra International LLC, Azusa, CA (US)

(72) Inventor: Howard T. Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 26 days.

(21) Appl. No.: 13/962,072

(22) Filed: Aug. 8, 2013

(65) Prior Publication Data
US 2014/0061556 A1  Mar. 6, 2014

Related U.S. Application Data

(60) Provisional application No. 61/697,006, filed on Sep. 5, 2012.

(51) Int. Cl.
*B66F 3/00* (2006.01)
*B21F 9/00* (2006.01)
*B60P 7/08* (2006.01)

(52) U.S. Cl.
CPC .................................. *B60P 7/0846* (2013.01)

(58) Field of Classification Search
USPC ......... 254/220, 222, 223, 225, 226, 229, 231, 254/241, 243; 24/68 CD; 410/100, 103
See application file for complete search history.

(56) References Cited

U.S. PATENT DOCUMENTS

| 1,053,692 | A | * | 2/1913 | Alspach | 74/396 |
| 1,080,503 | A | * | 12/1913 | Ulrich | 74/425.5 |
| 1,886,046 | A | * | 11/1932 | Rico | 140/152 |
| 2,521,191 | A | * | 9/1950 | Standland | 254/343 |
| 2,604,098 | A | * | 7/1952 | Kranc | 606/203 |
| 2,978,224 | A | * | 4/1961 | Moseley et al. | 254/344 |
| 3,101,927 | A | * | 8/1963 | Gray | 410/103 |
| 3,858,631 | A | | 1/1975 | Andersson et al. | |
| 4,154,427 | A | * | 5/1979 | Hofmann | 24/68 CD |
| 4,155,537 | A | * | 5/1979 | Bronson et al. | 242/388.3 |

(Continued)

FOREIGN PATENT DOCUMENTS

| JP | 2001-254706 | 9/2001 |
| WO | WO 2004-067318 A1 | 8/2004 |
| WO | WO2011-059010 A1 | 5/2011 |

OTHER PUBLICATIONS

International Preliminary Report on Patentability for PCT/US2012/027981, date of issuance Dec. 3, 2014.

(Continued)

*Primary Examiner* — Emmanuel M Marcelo
*Assistant Examiner* — Michael Gallion
(74) *Attorney, Agent, or Firm* — Brinks Gilson & Lione

(57) ABSTRACT

A strap tensioning system is provided. The system includes a frame comprising a first side wall that retains a ledge. A core shaft retains a flexible shaft and is rotatable by a drive shaft as urged by a crank handle. The crank handle supports an arm that is pivotable with respect to the crank handle, between a stowed position where the arm is substantially parallel to the crank handle, and a locking position where the arm is substantially perpendicular to the crank handle. The crank handle and arm are configured such that the arm disposed within the ledge when the crank handle is in registry with the ledge and the arm is in the locked position, thereby preventing rotation of the crank handle with respect to the frame.

18 Claims, 14 Drawing Sheets

(56) References Cited

U.S. PATENT DOCUMENTS

| | | | |
|---|---|---|---|
| 4,199,182 A * | 4/1980 | Sunesson | 24/68 CD |
| 4,278,002 A * | 7/1981 | Siminoff | 84/304 |
| 4,510,651 A * | 4/1985 | Prete et al. | 24/68 R |
| 4,565,229 A | 1/1986 | Larson | |
| 5,295,664 A * | 3/1994 | Kamper | 254/220 |
| 5,388,480 A * | 2/1995 | Townsend | 74/501.5 R |
| 5,611,521 A * | 3/1997 | Grover et al. | 254/235 |
| 5,800,105 A * | 9/1998 | Stump | 410/103 |
| 5,904,341 A * | 5/1999 | Norrby | 254/243 |
| 6,007,053 A * | 12/1999 | Huang | 254/247 |
| 6,139,233 A * | 10/2000 | Wilsey | 410/100 |
| 6,364,583 B1 | 4/2002 | Koller | 410/89 |
| 6,648,257 B2 * | 11/2003 | Lu | 242/284 |
| 6,824,339 B1 * | 11/2004 | Childers | 410/103 |
| 6,880,810 B1 * | 4/2005 | Hu | 254/218 |
| 6,966,543 B2 * | 11/2005 | Loudamy | 254/243 |
| 7,055,804 B2 * | 6/2006 | Scott | 254/231 |
| 7,117,628 B1 * | 10/2006 | Bailey | 43/3 |
| 7,192,009 B2 * | 3/2007 | Massey | 254/216 |
| 7,216,849 B2 | 5/2007 | Tremblay | 254/220 |
| 7,618,021 B2 * | 11/2009 | Leone et al. | 254/223 |
| 7,628,383 B2 | 12/2009 | Cumbers | |
| 7,850,145 B2 * | 12/2010 | Heravi et al. | 254/275 |
| 7,854,043 B2 | 12/2010 | Wang | |
| 7,874,047 B2 | 1/2011 | Breeden | |
| 8,272,820 B2 * | 9/2012 | Numata | 410/103 |
| 8,312,601 B2 | 11/2012 | Huang | |
| 8,370,997 B2 * | 2/2013 | Wright | 24/68 CD |
| 2002/0153517 A1 | 10/2002 | Huang | |
| 2004/0013490 A1 * | 1/2004 | Cauchon | 410/103 |
| 2004/0031953 A1 * | 2/2004 | Leggett | 254/1 |
| 2004/0155230 A1 * | 8/2004 | Fortin | 254/219 |
| 2004/0202520 A1 * | 10/2004 | Guenther | 410/103 |
| 2005/0267518 A1 * | 12/2005 | Wright et al. | 606/203 |
| 2006/0102265 A1 * | 5/2006 | Wright | 152/158 |
| 2006/0169957 A1 * | 8/2006 | Gilman | 254/223 |
| 2006/0180800 A1 * | 8/2006 | Tremblay | 254/229 |
| 2007/0189873 A1 * | 8/2007 | Breeden | 410/100 |
| 2008/0104811 A1 | 5/2008 | Burrows et al. | |
| 2009/0057633 A1 * | 3/2009 | Beck et al. | 254/420 |
| 2009/0271976 A1 * | 11/2009 | Huang et al. | 29/802 |
| 2010/0293765 A1 * | 11/2010 | Huang | 24/68 CD |
| 2010/0293766 A1 * | 11/2010 | Huang | 24/68 CD |
| 2012/0227223 A1 * | 9/2012 | Knox | 24/68 CD |
| 2014/0061556 A1 | 3/2014 | Know | |

OTHER PUBLICATIONS

International Search Report and Written Opinion for International Application No. PCT/US2013/054508, date of mailing Oct. 22, 2013.

Office Action dated Jun. 27, 2014 for U.S. Appl. No. 13/413,750.

* cited by examiner

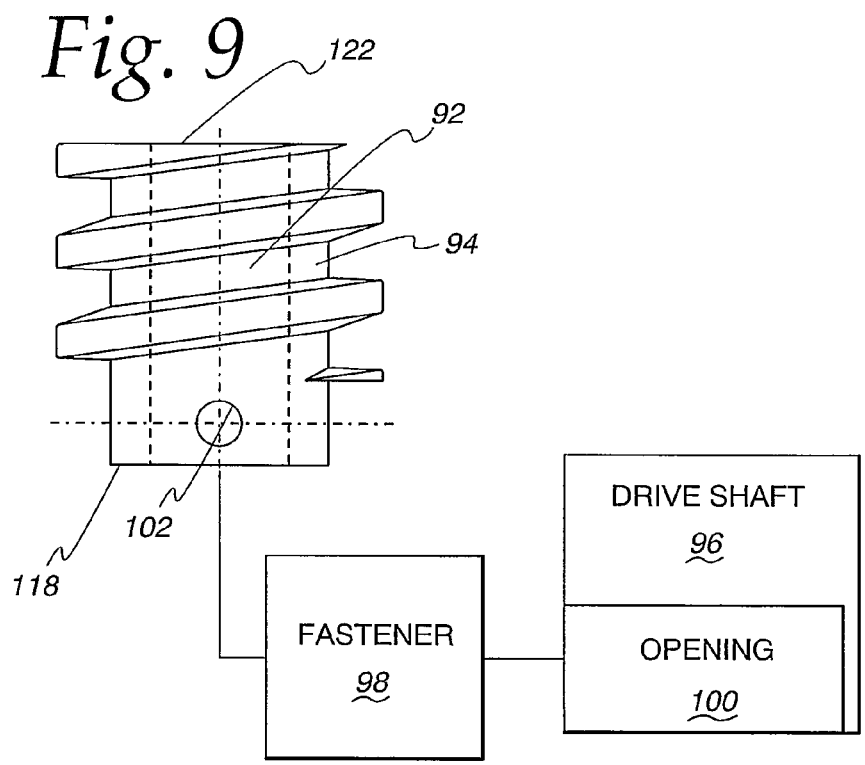
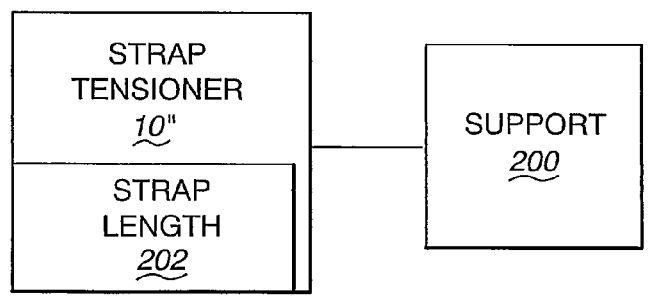

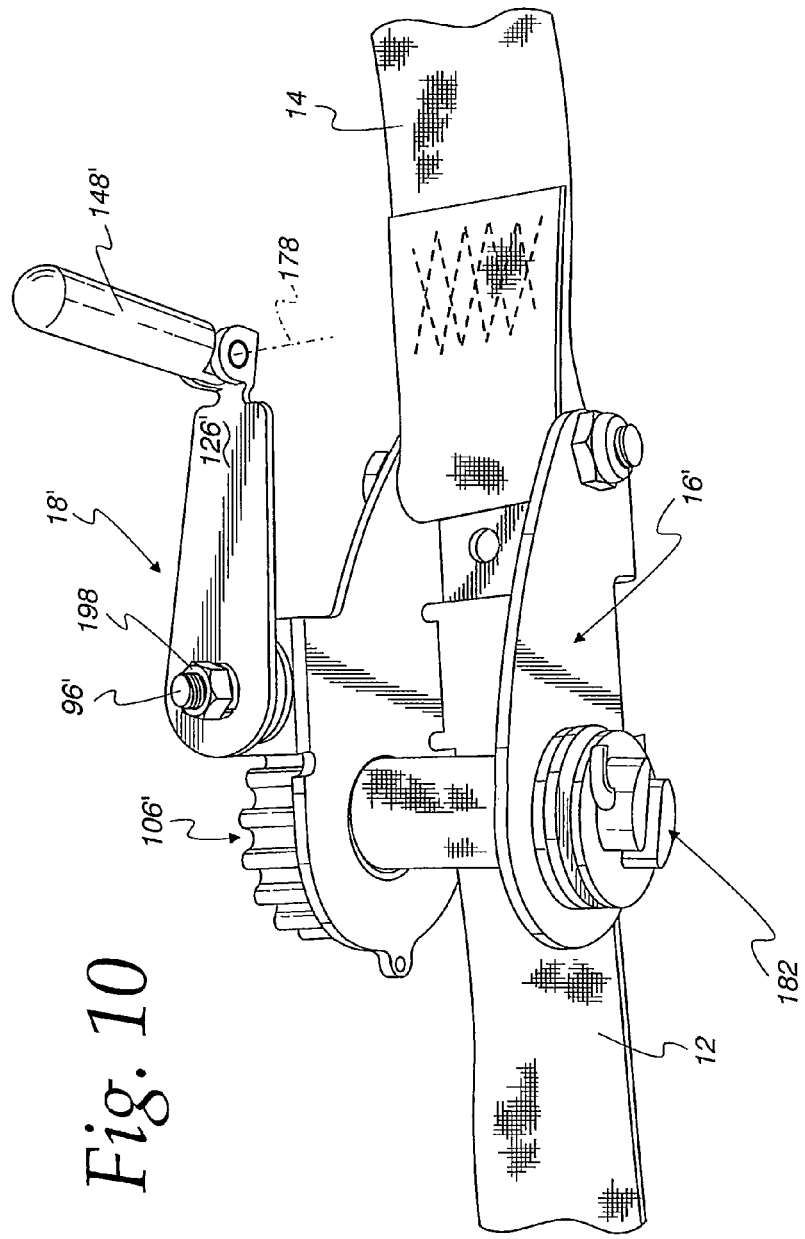

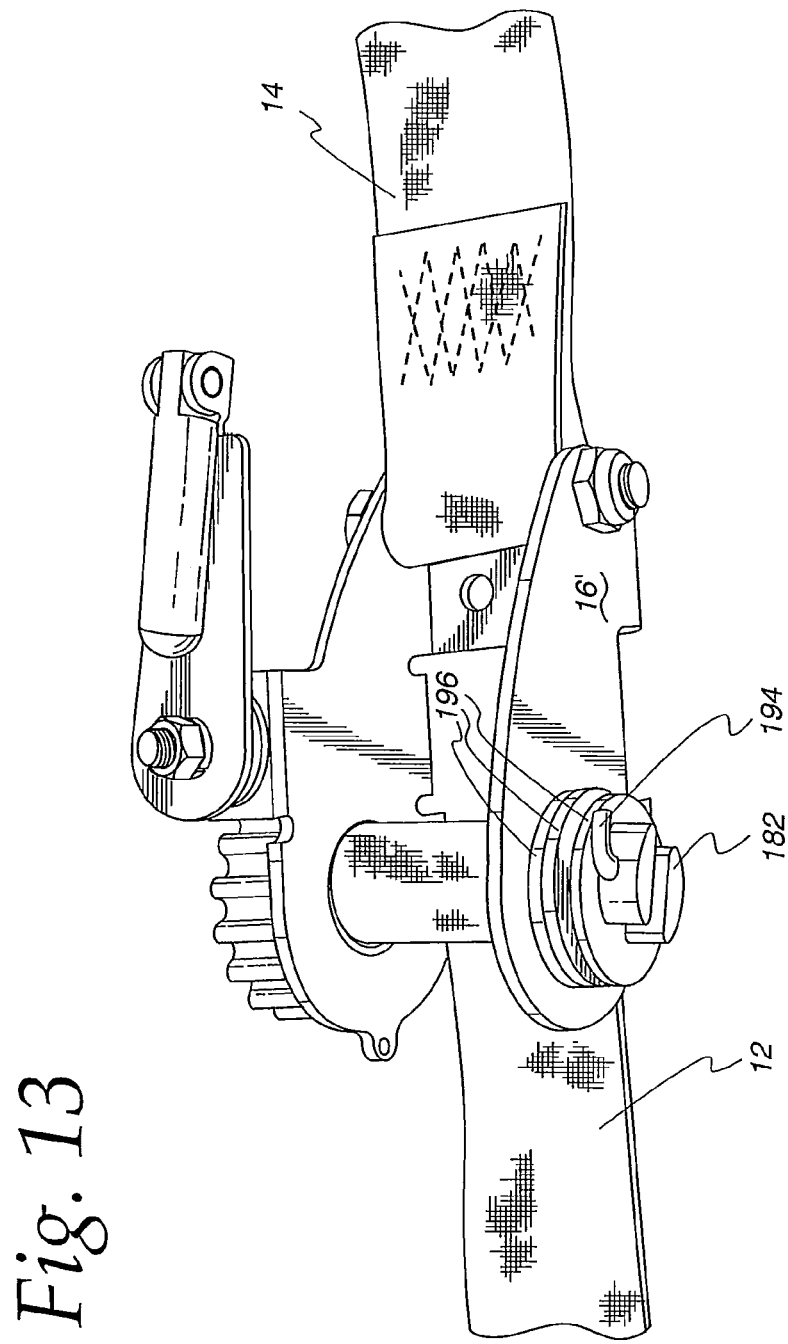

STRAP TENSIONING SYSTEM

CROSS-REFERENCE TO RELATED APPLICATIONS

This application claims priority from U.S. Provisional Application No. 61/697,006, filed on Sep. 5, 2012, the entirety of which is fully incorporated by reference herein.

TECHNICAL FIELD

This disclosure relates to tensioners for flexible straps used to secure cargo, as on vehicles or the like. Flexible straps are used in a wide range of environments to confine and hold down objects. Straps are normally spaced strategically across the articles and/or pallets and tensioned to thereby prevent shifting of the pallets while the vehicle is moving. Different mechanisms have been devised to tension straps through either a manual actuator or utilizing a powered input. For example, a ratchet mechanism has been used to progressively tension a strap.

BRIEF SUMMARY

In one form, the invention is directed to a strap tensioning system including: a frame; a core shaft on the frame; first and second separate lengths of flexible strap extending generally oppositely away from the frame; a drive shaft; and a gear assembly made up of a worm and a worm gear that are driven by the drive shaft. The drive shaft is operable to drive the gear assembly to thereby cause the first length of flexible strap to be wrapped around the core shaft to thereby: a) vary a combined effective length of the first and second lengths of flexible strap; and b) produce tension on the first and second lengths of strap.

In one form, the frame has first and second side walls between which a strap storage space is defined. The frame has a top and bottom and spaced first and second ends. In one form, the core shaft extends between the first and second side walls and moves guidingly around a first axis.

In one form, the drive shaft is operable by being moved around a second axis and the worm is driven by the drive shaft around the second axis.

In one form, the frame has a flat mounting surface to be engaged with a support for the strap tensioning system. The flat mounting surface resides in a first plane and the second axis is substantially orthogonal to the first plane.

In one form, an anchor post is provided on the frame and connected to an end of the second length of flexible strap.

In one form, the anchor post has a length with a third axis and the second axis resides between the first and third axes.

In one form, the strap tensioning system further includes a crank handle for operating the drive shaft. The crank handle has a body with a length projecting away from the second axis to a free end. The free end traces an annular path with a diameter as the crank handle is moved to operate the drive shaft and the majority of the diameter of the annular path resides between the first and second frame ends.

In one form, the second axis resides approximately midway between the first and second frame ends.

In one form, the diameter of the annular path is approximately equal to a distance between the first and second frame ends.

In one form, the crank handle further includes a graspable component adjacent to the crank handle free end that can be grasped by a user to manually move the crank handle.

In one form, the graspable component is movable relative to the crank handle body between operating and stored positions and the graspable component has a projection along the second axis that is greater with the graspable handle in the operating position than with the graspable handle in the stored position.

In one form, the drive shaft has an axis. One of the side walls is formed from a flat piece and the flat piece is bent to define a tab for supporting the drive shaft and through which the drive shaft axis extends.

In one form, there is a first web that connects between the first and second side walls and the first web and first and second side walls are made from a single piece of formed flat metal stock.

In one form, the single piece of flat metal stock is bent to define spaced tabs upon which the drive shaft is supported.

In one form, the strap tensioning system further includes a lock assembly having on and off states and at least one lock component. With the lock assembly in the on state, the at least one lock component interacts with the worm gear to block movement of the worm gear.

In one form, the strap tensioning system further includes a cup-shaped cover component that cooperates with one of the side walls to define a chamber for at least a part of the gear assembly.

In one form, there is a second web that connects between the first and second side walls and is defined by the single piece of formed flat metal stock.

In one form, the gear assembly is provided on one of the side walls and the other of the side walls has a flat shape residing in a plane and the other of the side walls has a rib bent out of the plane between the first and second webs.

In one form, the strap tensioning system is provided in combination with a powered drive for turning the drive shaft.

Another representative embodiment of the disclosure provides for a strap tensioning mechanism. The mechanism includes a frame comprising a first side wall that retains a ledge, a core shaft on the frame, and first and second separate lengths of flexible strap extending generally oppositely away from the frame. The mechanism additionally includes a drive shaft, and a gear assembly comprising a worm and a worm gear that are driven by the drive shaft. The drive shaft is operable to drive the gear assembly to thereby cause the first length of flexible strap to be wrapped around the core shaft to thereby: a) vary a combined effective length of the first and second lengths of flexible strap; and b) produce tension on the first and second lengths of strap. A crank handle is associated with the drive shaft, the crank handle having a body with a length projecting away from the drive shaft to a free end. The free end of the crank handle is pivotably supporting an arm between an operating and a locking position, the arm configured to be in registry with the ledge in the frame when in the locking position to prevent rotation of the crank handle and drive shaft.

Another representative embodiment of the disclosure is provided. The embodiment includes a tensioner that includes a frame comprising a first side wall that retains a ledge, and a core shaft on the frame, configured to receive an end of a strap for restraining cargo. A drive shaft is provided and is associated with a gear assembly comprising a worm and a worm gear that are driven by the drive shaft. The drive shaft is operable to drive the gear assembly to thereby cause rotation of the core shaft. A crank handle is associated with the drive shaft, the crank handle having a body with a length projecting away from the drive shaft to a free end. The free end of the crank handle pivotably supports an arm between an operating and a locking position, the arm configured to be in registry with the ledge in the frame when in the locking position to prevent rotation of the crank handle and drive shaft.

Advantages of the disclosed system will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

FIG. 1 is a side elevation view of a strap tensioner, according to the present invention;

FIG. 2 is a plan view of the strap tensioner in FIG. 1 with cooperating strap lengths that, together with the strap tensioner, define a strap tensioning system;

FIG. 9 is an enlarged, elevation view of a worm that is part of a gear assembly that transmits a turning force of the drive shaft into a turning force upon a core shaft around which a strap is wound;

FIG. 10 is a fragmentary, perspective view of a strap tensioning system with a modified form of strap tensioner, according to the invention;

FIG. 13 is a view as in FIG. 10 with a graspable component repositioned from an operative position, as in FIG. 10, to a stored position;

FIG. 14 is a schematic representation of a modified form of strap tensioning system, according to the present invention;

DETAILED DESCRIPTION OF THE DRAWINGS AND THE PRESENTLY PREFERRED EMBODIMENTS

Figures 1, 2:
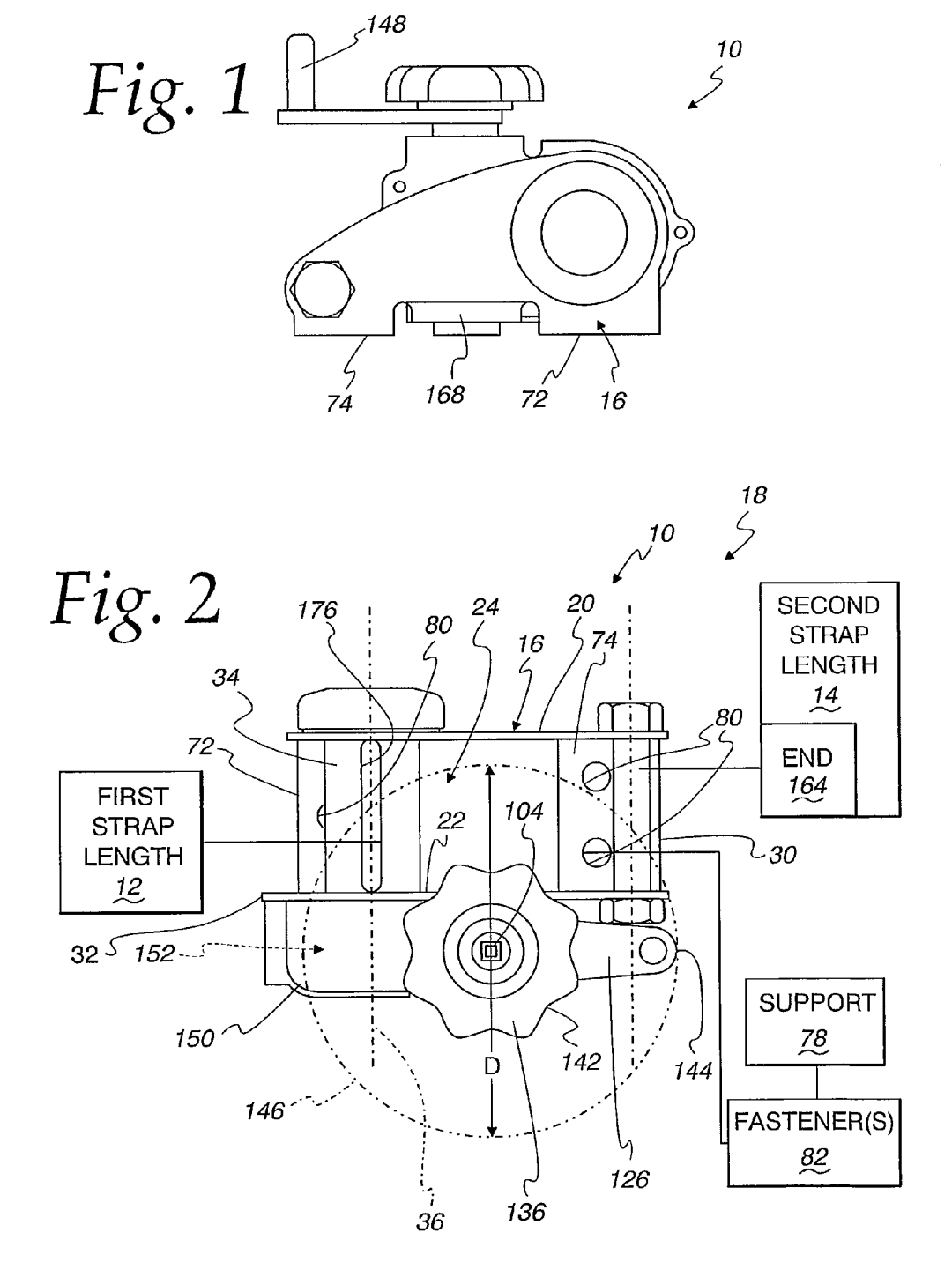
Figure 3:
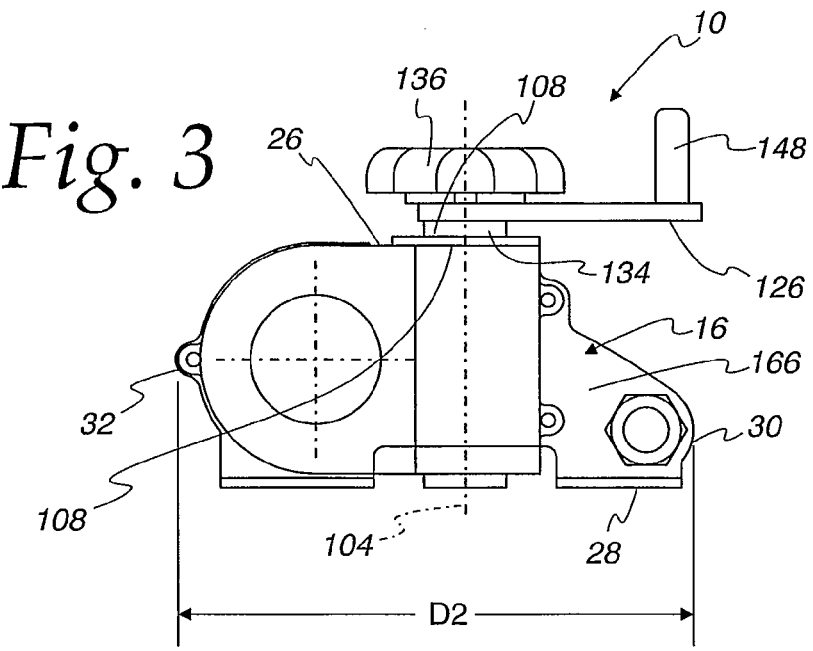
FIG. 3 is an elevation view of the strap tensioner from the side opposite that in FIG. 1.
Figure 4:
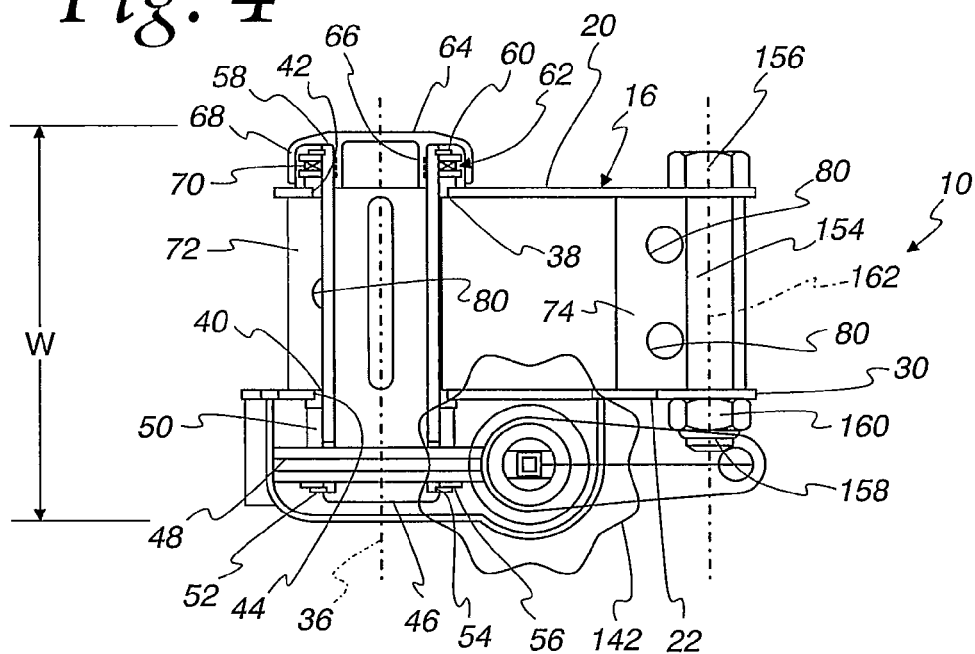
FIG. 4 is a view as in FIG. 3 wherein a portion of the strap tensioner has been broken away to expose working components thereon.

One form of strap tensioner, according to the present invention, is shown in FIGS. 1-9 at 10. The strap tensioner 10, as shown in FIG. 2, is operatively associated with first and second strap lengths 12, 14 that project oppositely from a frame 16 on the strap tensioner 10. The strap tensioner 10 and strap lengths 12, 14 together define a strap tensioning system 18. The strap lengths 12, 14 may be made from well known flexible materials that are preferably flat. The width of the strap material is not critical, nor is it critical that both strap lengths 12, 14 have the same construction. In one exemplary form, the strap tensioner 10 can be made with a compact overall design to accommodate a typical two-inch wide web strap.

As will be explained in greater detail below, the strap tensioner 10 can be operated to vary, by either extending or shortening, a combined effective length of the first and second strap lengths 12, 14. By shortening the effective length thereof, a tension can be produced on both the first and second strap lengths 12, 14.

The strap lengths 12, 14 may be part of the same continuous strap. Alternatively, the strap lengths 12, 14 may have ends spaced from the strap tensioner 10 that are fixed.

The frame 16 on the strap tensioner 10 has first and second side walls 20, 22, respectively, between which a strap storage space 24 is defined. The frame has a top 26, a bottom 28, and first and second spaced ends 30, 32, respectively. A core shaft 34 extends between and through the side walls 20, 22 and is mounted for movement relative to the frame 16 about a first axis 36. Bushings 38, 40 are provided respectively in openings 42, 44 on the side walls 20, 22, to guide smooth turning of the core shaft 34 relative to the frame 16.

The core shaft end 46 supports a worm gear 48. A spacer 50 resides between the bushing 40 and worm gear 48. A retaining clip 52 is seated in an annular undercut 54 on the core shaft 34 and axially captures a washer 56 against the worm gear 48.

The opposite core shaft end 58 receives a retaining clip 60 that is assembled in the same manner as the retaining clip 52. A bearing 62 is captured between the retaining clip 60 and the bushing 38. With this arrangement, the core shaft 34 is confined against axial movement relative to the frame 16 and guided smoothly for turning relative thereto around the axis 36.

A cap 64 is mounted at the shaft end 58 and has a cylindrical seating portion 66 that frictionally seats within the core shaft 34. A cup-shaped wall 68 on the cap 64 defines in conjunction with the side wall 20 a chamber 70 within which the retaining clip 60 and bearing 62 reside.

The walls 20, 22 are joined by first and second webs 72, 74 at the bottom of the frame 16. The bottoms of the webs 72, 74 together define a flat mounting surface 76 that resides within a plane P. The mounting surface 76 can be engaged with a support 78 for the strap tensioning system 18. The support 78 may be any sturdy structure that will stably support the tensioning system 18.

Openings 80 are provided through the webs 72, 74 to accept one or more fasteners 82 which can be directed therethrough and into the support 78. The nature of the fasteners 82 is not critical to the present invention and is dictated by the particular application.

The worm gear 48 has a spur gear configuration. The worm gear 48 has diametrically opposite, radially inwardly projecting tabs 86 that are slid axially into slots 88 on the core shaft end 46 produced by bifurcation thereof. Through this arrangement, the worm gear 48 is positively keyed against turning relative to the core shaft about the axis 36.

The worm gear 48 has teeth 90 that move within a spiral groove 92 formed on a worm 94. The worm 94 is mounted to a drive shaft 96. A fastener 98 is directed into aligned openings 100, 102, respectively on the drive shaft 96 and the worm 94. The drive shaft 96 and worm 94 move together as one piece around a second axis 104. The worm 94 and worm gear 48 together make up a gear assembly at 106. Turning of the worm 94 and drive shaft 96 about the axis 104 causes the core shaft 34 to turn around its axis 36.

The drive shaft 96 and worm 94 are supported on the frame 16 by upper and lower tabs 108, 110, respectively. The tabs 108, 110 have aligned throughbores 112, 114, respectively. The bores 112, 114 are concentric with the axis 104. The drive shaft 96 extends through the tabs 108, 110 and the worm 94 that is captive therebetween. Spacers 116 are provided between the bottom worm end 118 and the tab 110.

Separate spacers 120 reside between the upper worm end 122 and upper tab 108. Spring washers 124 are located between the separate spacers 120 to permit a modicum of axial shifting of the worm 94 so as to thereby prevent binding with the worm gear 48.

A flat crank handle 126 has a keying element 128 that is press fit to a keying element 130 on the drive shaft 96 so that a body 132 of the crank handle projects away from the axis 104 to provide a lever arm through which the drive shaft 96 and associated worm 94 can be driven around the axis 104.

A spacer 134 resides between the crank handle 126 and upper tab 108. A retaining cap 136 can be directed over the end 138 of the drive shaft 96 and may be press fit or screw threaded to an end fitting 140 to captively maintain the crank handle 126 in its operative position against the spacer 34 and underlying tab 108. The retaining cap 136 has a knurled, or wave-patterned, perimeter 142 to facilitate grasping and turning thereof. The retaining cap 136 can be grasped and turned to secure the retaining cap 136 and/or to assist turning of the drive shaft 96, as hereinafter explained.

The crank handle body 132 projects away from the axis 104 to a free end 144. As the drive shaft 96 is turned around the axis 104, the free end 144 traces an annular path, indicated by the dotted line 146. The annular path has a diameter D. The majority, and as seen in FIG. 2 substantially the entirety, of the diameter D resides between the first and second frame ends 30, 32.

In the embodiment depicted, the axis 104 resides approximately mid-way between the first and second frame ends 30, 32. Further, as seen in FIGS. 2 and 3, the diameter D of the annular path is approximately equal to a distance D2 between the first and second frame ends 30, 32.

A graspable component, in the form of a post 148, projects vertically from the crank handle 126 adjacent to the free end 144. The post 148 can be grasped, as between a user's finger(s) and thumb, to facilitate turning of the crank handle 126 about the axis 104. As noted above, the turning force can be assisted by a torque applied to the retaining cap 136.

A cup-shaped cover component 150 can be releasably connected to the side wall 22 and cooperates therewith to define a chamber 152 for at least a part, and in this case the entirety, of the gear assembly 106.

An anchor post 154 extends between the side walls 20, 22 adjacent to the frame end 30. In this embodiment, the anchor post 154 is in the form of a bolt with a head 156 at one end and a shank with a threaded end 158 opposite the head end that threadably engages a nut 160. The anchor post 154 has a length with a third axis 162. An end 164 of the second strap length 14 connects to the anchor post 154, as by being wrapped around the anchor post to be doubled against itself and secured, as shown for the strap length 14 in FIG. 10 on a separate embodiment of strap tensioning system 18'.

The above described design allows the frame 16 to be made from a single piece of flat stock at 166, that may be formable metal. The single piece 166 may be used to define all or any different ones of the side walls 20, 22, webs 72, 74, and tabs 108,110. Any two or more of these components could be formed from the single flat piece 166. If less than all of the components are made from a single piece, they might be combined by welding and/or the use of fasteners by techniques well known to those skilled in the art.

By turning the crank handle 126, the core shaft 34 is turned which causes the first length of flexible strap 12 to be wrapped around the core shaft 34 to thereby shorten the combined effective length of the first and second lengths 12, 14 of the flexible strap. As this occurs, tension is produced on both the first and second strap lengths 12, 14.

Figure 5:
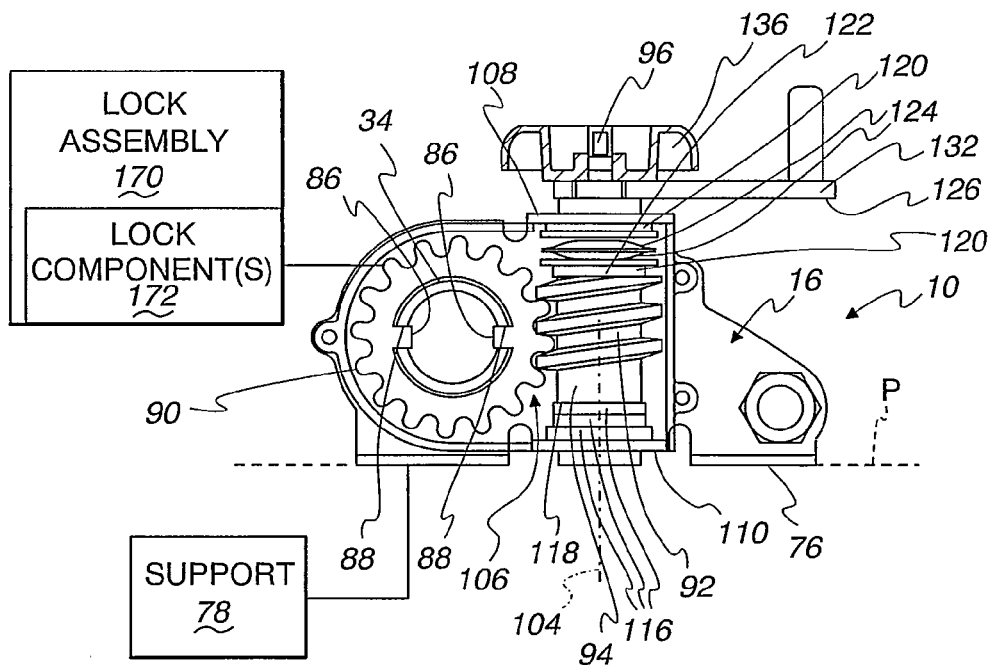
FIG. 5 is a view as in FIG. 3 with a cover component removed.
Figure 6:
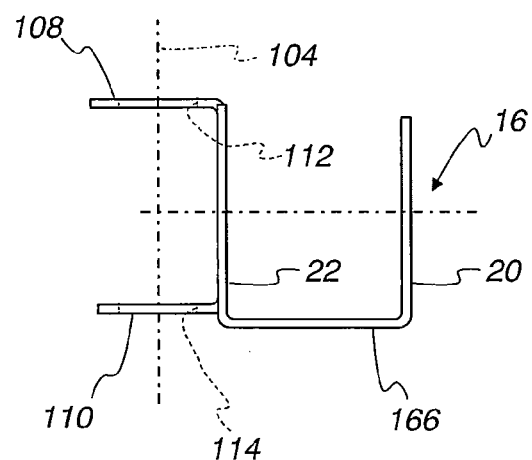
FIG. 6 is an end elevation view of a frame on the strap tensioner in FIGS. 1-5.
Figure 7:
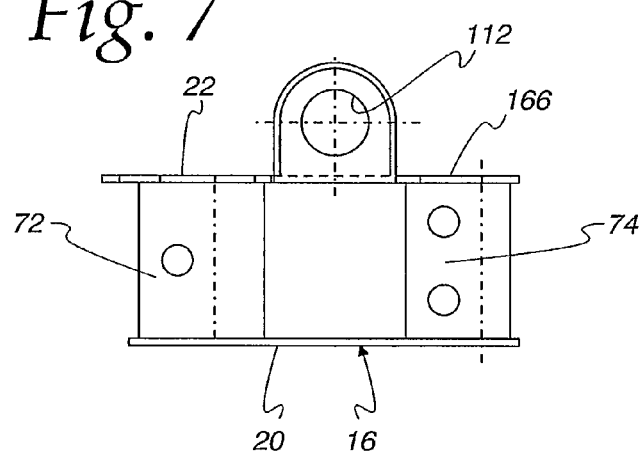
FIG. 7 is a plan view of the frame in FIG. 6.

The depicted arrangement of components allows for a very compact overall design for the strap tensioner 10. In this embodiment, the second axis 104 is oriented substantially orthogonally to the plane P, as seen in FIG. 5. While a substantially perpendicular relationship is preferred, a slight angle to perpendicular, varying by 10°-15°, may be permitted without interfering with operation.

The axis 104 resides between the axes 36, 162. Accordingly, the components can be compactly placed within the dimension 02 between the ends 30, 32 of the frame 16.

The strap tensioner width W can be controlled so that it is not substantially greater than the width of the strap that will be accommodated by the frame 16. As noted, the invention can be used conveniently with a two inch strap width. The crank handle 126 moves in a path that overlies the frame 16 so that the space requirements for operation are controlled, thereby allowing the strap tensioning system 18 to be used in a relatively tight space.

In this embodiment, an elongate rib 168 is bent out of the plane of the wall 20 between the webs 72, 74 to provide clearance and for purposes of reinforcing the wall 20 against bending.

Another optional feature is the incorporation of a lock assembly 170 the frame 16, as seen in FIG. 5. The lock assembly 170 has at least one lock component 172. With the lock assembly in an on state, the at least one lock component 172 interacts with the worm gear 48 to block movement around the axis 36 at least in a direction that would tend to loosen tensioned strap lengths. This increases both the braking strength and adds security so that the worm gear 48 will not back off, as under the influence of vibrational forces with a light tension on the strap lengths.

Figure 8:
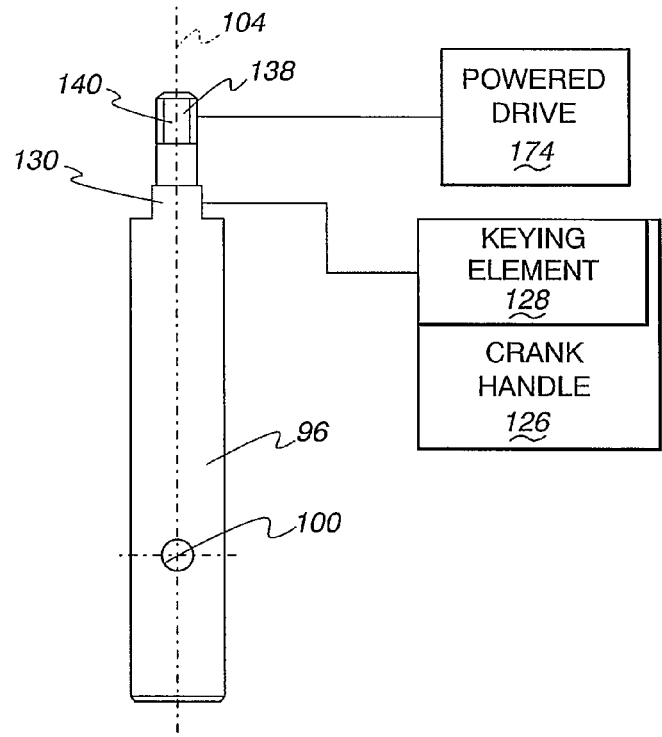
FIG. 8 is an enlarged, elevation view of a drive shaft on the strap tensioner in FIGS. 1-7.

As an alternative to using the crank handle 126, a powered drive, as shown at 174 in FIG. 8, may be keyed to the drive shaft 96. The system may be designed to accommodate only the powered drive 174. Alternatively, the system may be designed to be selectively manually or power driven. In that case, the retaining cap 136 can be removed to allow the power drive 174 to engage the end fitting 140 for turning of the drive shaft 96. The drive may be a conventionally available drive, such as a 120v drill, a pneumatic drive, etc. The drive shaft 96 may alternatively be driven by a releasable tool, such as a ratchet wrench.

By reason of using the worm arrangement, tension produced on the strap will not induce a force upon the drive shaft 96 tending to turn the worm gear 48. In fact, tension generated by the strap lengths 12, 14 tends to wedge the worm gear teeth 90 within the worm groove 92, thereby minimizing the likelihood of back-off of the core shaft 34 with the strap lengths 12, 14 under tension.

The gearing can be designed by one skilled in the art so that an adequate tension can be applied to a strap without excessive torque application by a user. Connection of the first strap length 12 to the core shaft 34 is facilitated by providing a through slot 176 therein.

In FIGS. 10-13, a modified form of strap tensioning system is shown at 18'. The strap tensioning system 18' cooperates with the first and second strap lengths 12, 14, in substantially the same manner as the strap tensioning system 18 does. Only differences between the strap tensioning systems 18, 18' will be described below, with elements on the strap tensioning system 18' identified with the same reference numerals as used to identify corresponding elements on the strap tensioning system 18, but with the addition of a "'" designation.

As can be seen by comparing FIGS. 2 and 10, the gear assembly 106' and crank handle 126' operate the same as the gear assembly 106 and crank handle 126 but are provided on the opposite side of the frame 16'.

Figure 11:
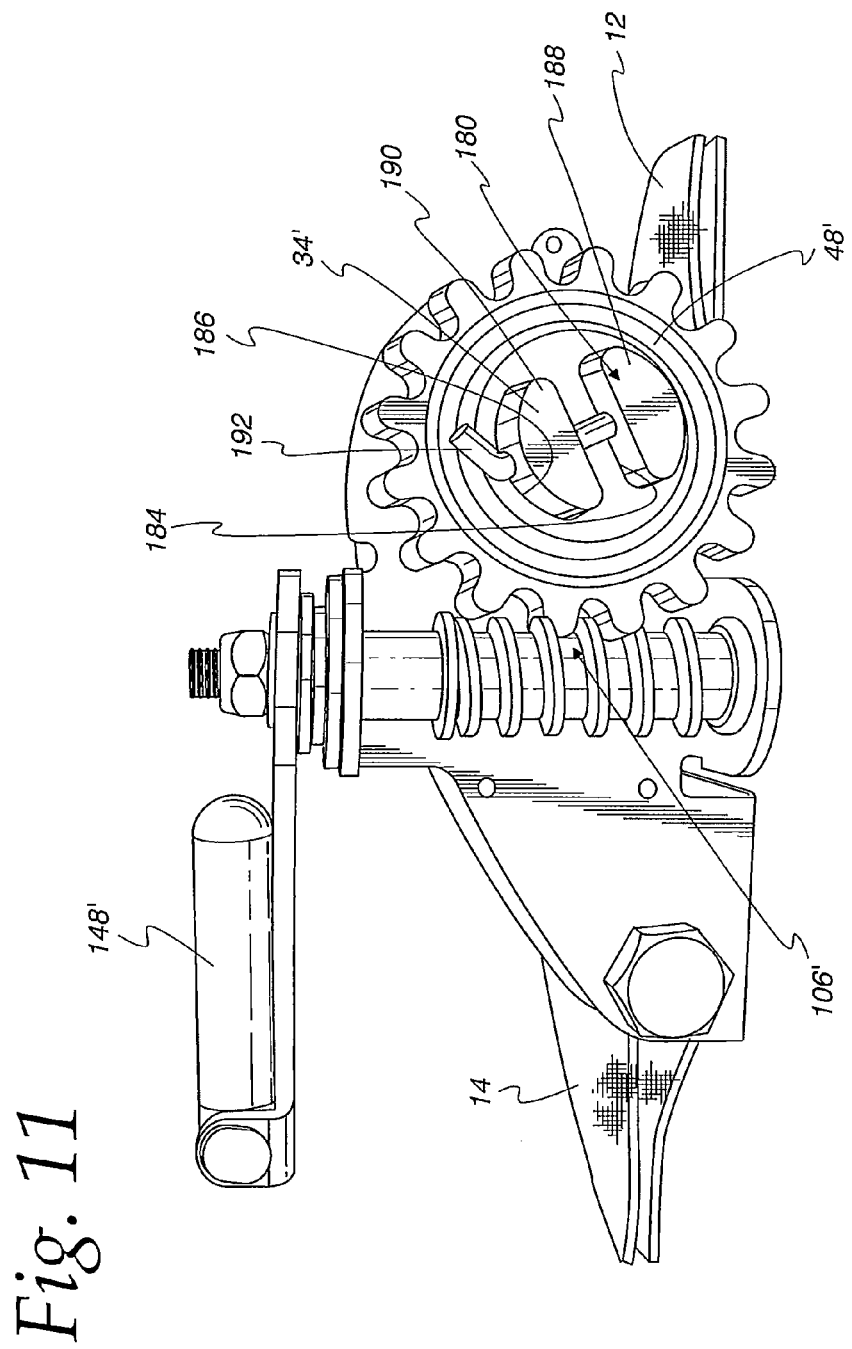
FIG. 11 is a fragmentary, elevation view of the strap tensioner from the side opposite that of FIG. 10.
Figure 12:
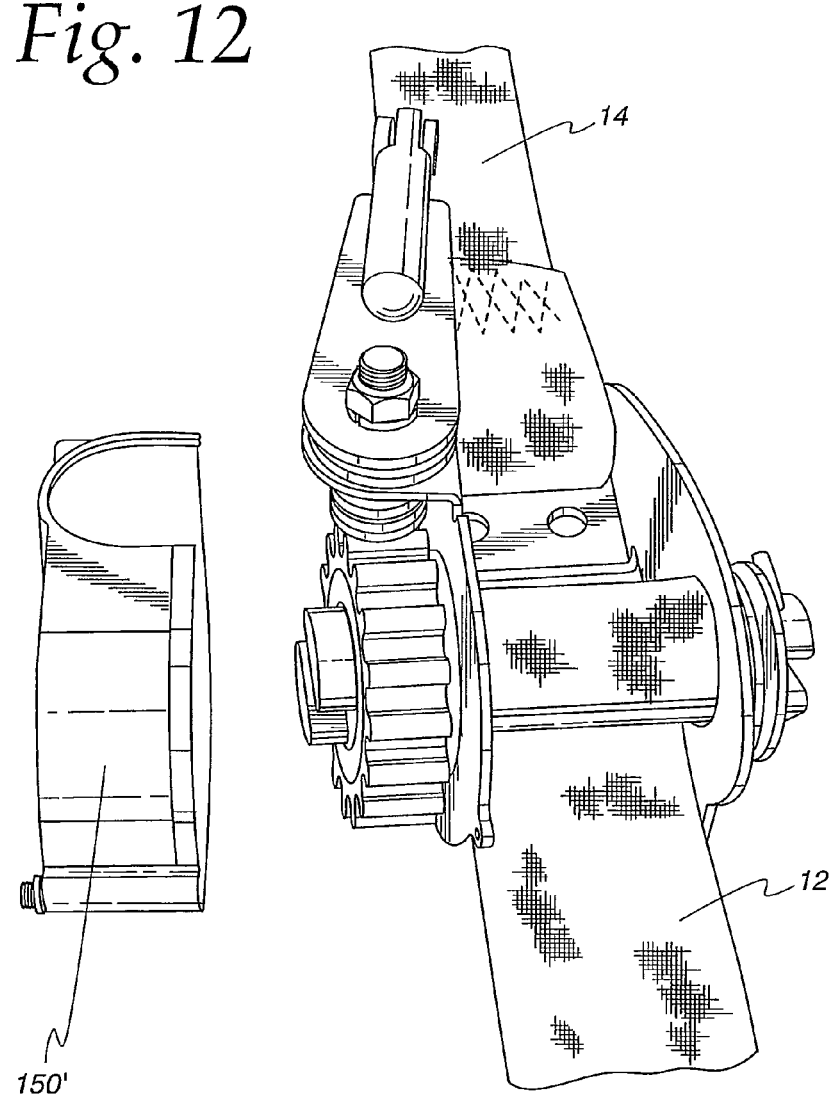
FIG. 12 is a view of the components in FIG. 10 from a different perspective and with a cap separated from a frame on the strap tensioner.

Whereas the graspable component/post 148 is fixed on the crank handle 126, the corresponding graspable component/post 148' is pivotable about an axis 178 relative to the crank handle 126' for movement between an operating position, as shown in FIG. 10, and a stored position, as shown in FIG. 11.

The core shaft 34' has bifurcated opposite ends 180, 182 and is split therebetween to obviate the need for the aforementioned slot 176 to facilitate fixing of the end of the strap length 12. The worm gear 48' has discrete openings 184, 186 through which complementarily-shaped portions 188, 190 of the core shaft 34', respectively, project. A bar 192 passes through the exposed shaft portions 188, 190 and is bent at its ends so that it will not separate therefrom. The bar 192 blocks the worm gear 48' against separation from the core shaft 34'.

The shaft end 182 has a similar configuration and cooperates with a bar 194 to block axial shifting of the core shaft 34'. Spacers 196 surround the core shaft 34' and reside between the bar 194 and frame 16'.

A cover component 150' cooperates with the frame 16' to cover the gear assembly 106'. In this embodiment, a nut 198 secures the crank handle 126' to the drive shaft 96'. While the strap fastener system has been described with respect to separate strap lengths 12, 14, a strap tensioner, according to the invention, as shown at 10" in FIG. 14, can be mounted to a support 200 and used to tension a single strap length 202.

Turning now to FIGS. 15-19, another strap tensioning device 500 is provided. The device 500 is similar to strap tensioner 10 discussed above, and components of the device 500 that are same as tensioner 10 will be referenced with respect to the same element numbers, for the sake of consistency. Moreover, one of ordinary skill in the art will understand with reference to this disclosure and this embodiment, that the majority of the structure discussed with respect to the above embodiments are usable in this embodiment as well. For the sake of brevity, these structures will not be specifically discussed with respect to this embodiment, but are incorporated herein as appropriate as discussed above.

The strap tensioning device 500 is configured to support strap lengths 12, 14 that are conventional and are used to wrap and hold down cargo for transportation. The device includes a frame 516 that is constructed from opposed first and second sidewalls 520, 522 that are each connected to a bottom 521. The first and second sidewalls 520, 522 and the bottom define a strap storage space 524, which is sized to enclose a wrapped first strap 12 therewithin as it is wrapped around a core shaft 34 as the straps are tightened. The second strap 14 may be supported by an anchor post, like the anchor post 154 discussed above and depicted in FIG. 4. The first and second sidewalls 520, 522 may be formed in generally the same manner as the respective first and second side walls 20, 22, discussed above, and the differences with the first and second side walls 520, 522 are discussed below.

Figure 15:
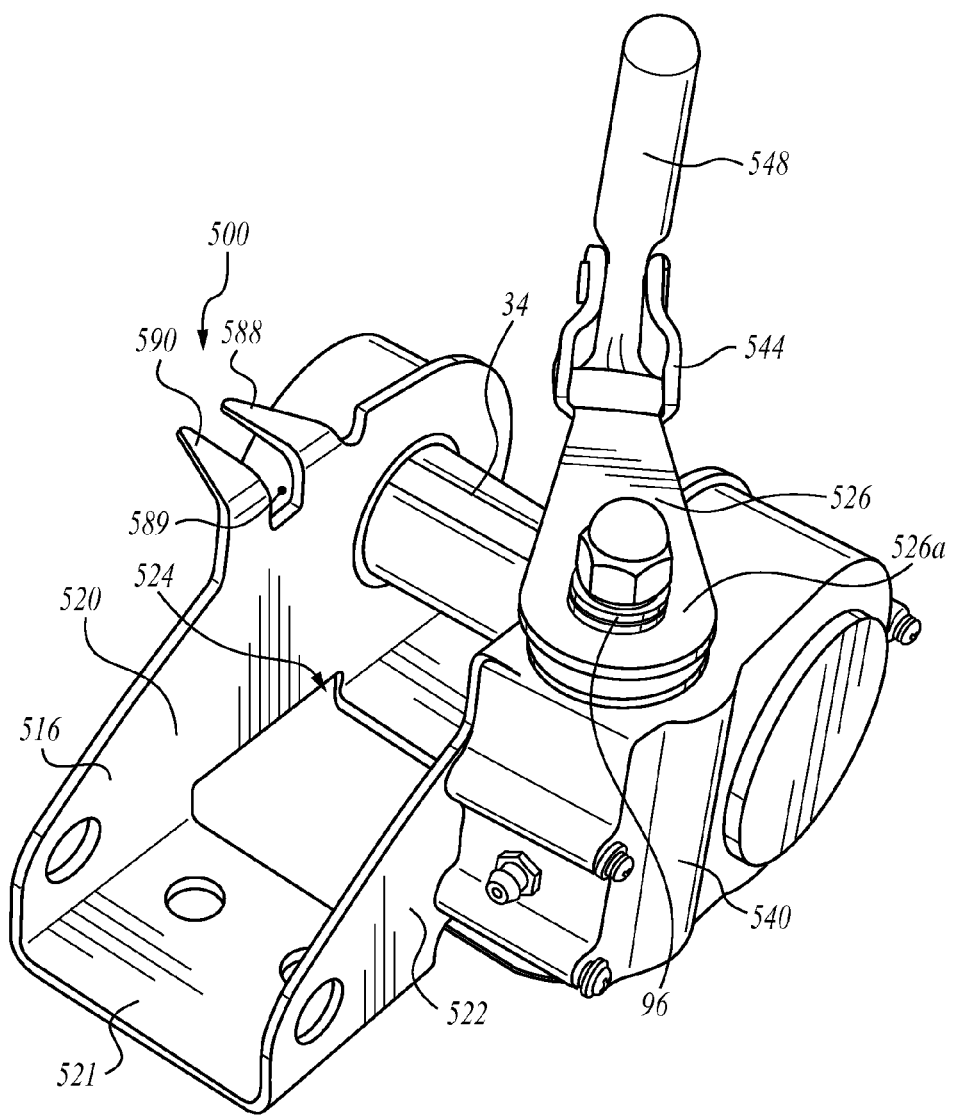
FIG. 15 is a perspective view of a strap tensioner showing the post in an operation position.

As best shown in FIG. 15, the first sidewall 520 includes a notch 589 defined upon the upper edge 520b of the first sidewall 520. The notch 589 may be a recess into the sidewall 520, or it may be formed between opposed raised portions. In some embodiments, the notch 589 may be defined between opposed ledges 588, 590 that extend away from the first sidewall 520 such as perpendicular to the sidewall 520 and away from the storage space 524. The ledges 588, 590 may extend in a cantilevered fashion and the ledges 588, 590 may be formed from the same sheet of material that forms the first side wall 520, with the ledges 588, 590 being bent into the desired position. In other embodiments, the ledges 588, 590 may be formed from a separate member than the first sidewall 520 and affixed to the side wall.

The second sidewall 522 supports the gearbox 540 that houses the transmission which proves torque to turn the core shaft 34 that is ultimately provided by the user by turning the crank handle 526. The transmission includes a worm gear 48 that meshes with a worm 94 disposed upon a drive shaft 96. The drive shaft 96 is fixed to a first end of the crank handle 526, such that the drive shaft 96 rotates as the crank handle 526 is rotated by the user. The worm gear 48, worm 94, and drive shaft 96 are constructed, meshed together, and fixed to the device 500 as discussed and depicted with respect to the devices 10 and 18', above.

The crank handle 526 is attached to the drive shaft 96 at a first end 526a of the crank handle 526. The crank handle 526 extends away from the drive shaft toward a second, free end 544. The free end 544, or structures discussed below that are associated with the free end 544 are normally manipulated by the user to rotate the crank handle 526 (and therefore the drive shaft 96 and core shaft 34) to pull in or release the strap 12 as desired. In some embodiments, the free end 544 of the crank handle 526 may support a post 548. The post 548 may be rigidly mounted to the crank handle 526 or may be rotatingly mounted thereto. The post 548 is normally the structure that is manipulated the user to apply torque to the drive shaft 96 by rotating the crank shaft 526.

Figure 16:
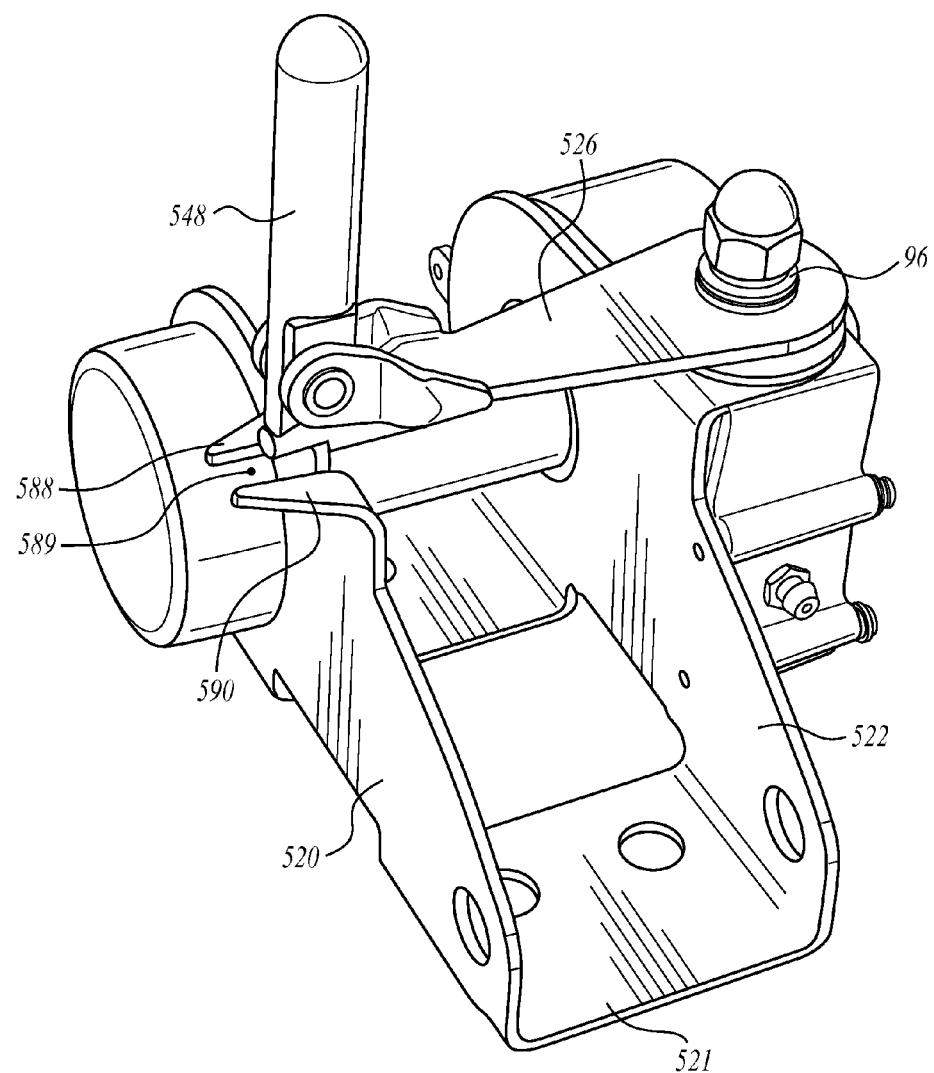
FIG. 16 is another perspective view of the strap tensioner of FIG. 15, showing the crank arm and arm aligned with the notch.
Figure 17:
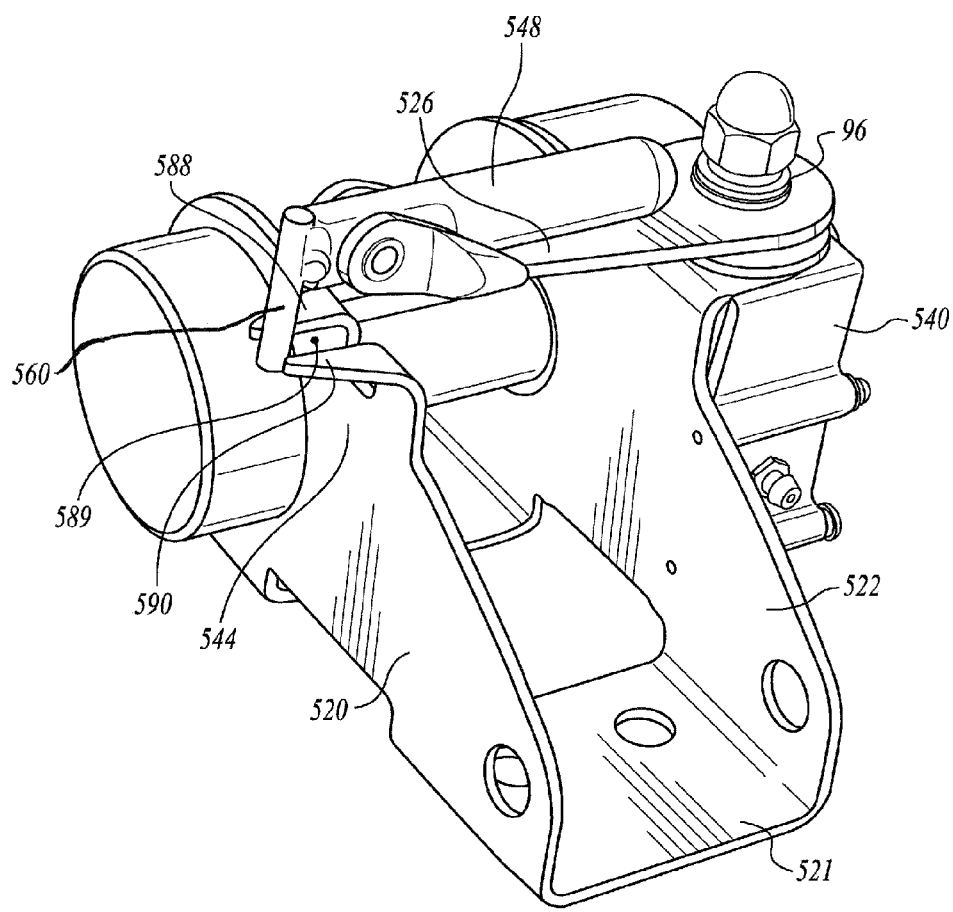
FIG. 17 is the view of FIG. 16, showing the arm in the locked position between opposing ledges.

The post 548 may be pivotable between an operation position (best shown in FIG. 16) and a storage position (best shown in FIG. 17). In the operation position, the post 548 may be perpendicular to the crank handle 526 to provide a structure for the user to ergonomically grab and manipulate for rotating the crank handle 526. Because the post 548 may be pivotable with respect to the crank handle 526, the post 548 may be manipulated while positioned in other angles with respect to the crank handle 526, within an convenient range between about 90 degrees and a position parallel with the crank handle 526 (i.e. the storage position).

The post 548 may be rotatable to a storage position where the post 548 is parallel with the crank handle 526, such that the post 548 does not significantly extend from the device 500, to minimize the inadvertent manipulation of the post 548 and resultant rotation of the drive shaft 96 once the straps 12, 14 have been sufficiently tightened by the user.

Figure 18:
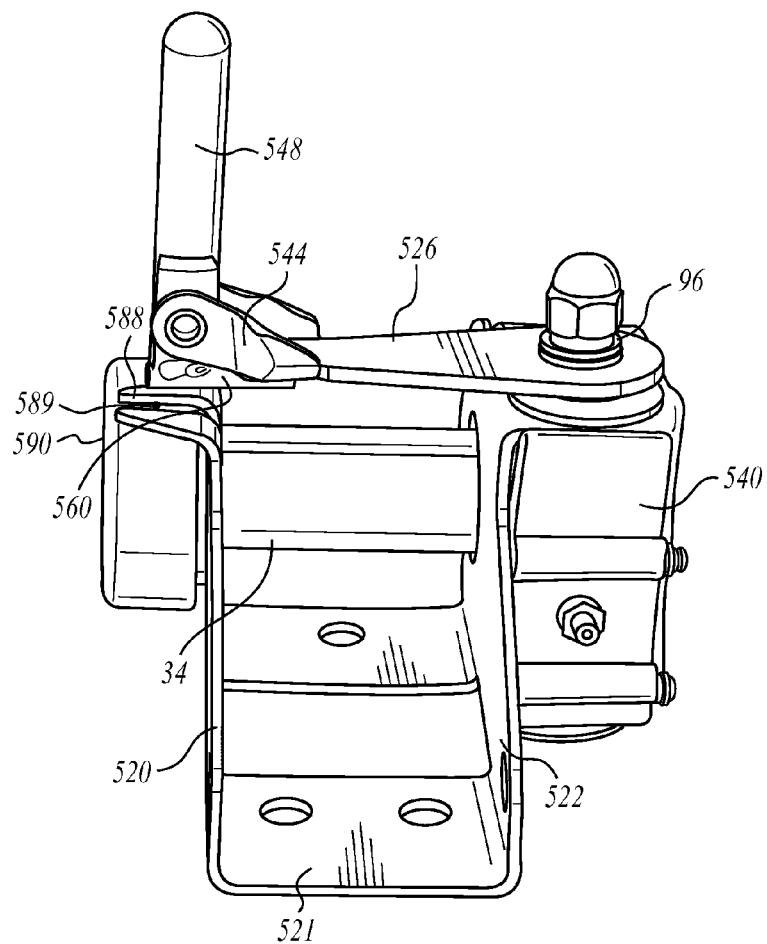
FIG. 18 is a front view of the strap tensioner of FIG. 15, showing the arm in the stowed position.

The free end 544 of the crank handle 526 may further include an arm 560 that extends therefrom and is pivotable between a locking position (best shown in FIG. 17) and a stowed position (best shown in FIG. 18). In some embodiments, the arm 560 may be fixed to the post 548, such that the arm 560 pivots when the post 548 pivots. In other embodiments, the arm 560 may be separately pivotable with respect to the crank handle 526, such that the position of the arm 560 is independent of the position of the post 548.

In embodiments where the arm 560 is fixed to the post 548, the arm 560 may be disposed in the stowed position when the post 548 is in the operation position, such that the arm 560 does not obstruct the rotation of the post 548 by the user. Similarly, when the arm 560 is in the locking position, the post 548 is in the storage position, such that the post 548 is disposed close to the crank handle 526 to minimize the chance of the post 548 being inadvertently manipulated when the device 500 is applying tension to straps 12, 14 to tie down cargo for transportation or long term storage.

Figure 19:
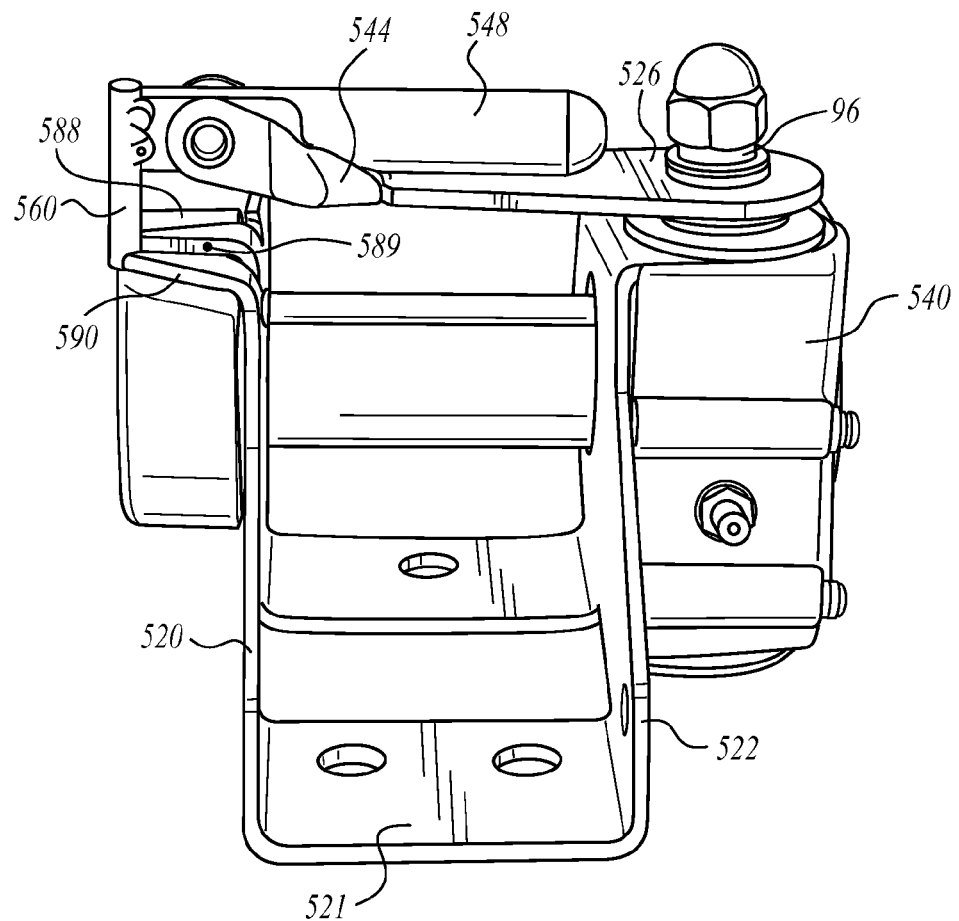
FIG. 19 is the view of FIG. 18, showing the arm in the locked position.

As best shown in FIG. 16, when the user has used the crank handle 526 to apply sufficient tension to the straps 12, 14 that are restraining cargo for storage or transportation (based upon the first strap 12 being sufficient wound around the core shaft 34 to establish the desired strap tension), the crank handle 526 is rotated to a position where the crank handle 526 and the arm 560 (which may be rotatingly mounted to the crank handle 526 such that a plane through the arm extends through the longitudinal axis of the crank handle 526) are aligned with the notch 589 in the first sidewall 520. When the crank handle 526 and arm 560 are in registry with the notch 589, the post 548 (in embodiments where the post 548 and arm 560 are fixed together) is rotated to move the arm 560 to the locking position and the post 548 to the storage position. As shown in FIGS. 17 and 19, as the arm 560 is rotated toward the locking position, the arm 560 rotates to extend within the notch and/or between the opposed ledges 588, 590, such that the crank handle 526 is prevented from rotation (or prevented from rotation more than a few degrees depending upon the width of the notch 589 or the separation between the two ledges 588, 590) due to engagement between the arm 560 and the notch 589 or the opposed ledges 588, 590. In embodiments there the arm 560 is disposed between two ledges 588, 590, the notch 589 may be provided to provide clearance for arm 560 rotation between the stowed and locking positions.

In some embodiments, the arm 560 may be biased into the locking position by a spring or other biasing member that is disposed with respect to the crank arm 526 to urge the arm 560 into the locking position. In embodiments where the arm 560 is fixed to the post 548, the user may manipulate the post 548, with the post in the operating position and the arm in the stowed position by pulling post 548 into the operation position against the biasing force of the biasing member. The biasing member maintains the arm 560 in the locking position (to be within the notch 589 and/or between the first and second ledges 588, 590) to provide protection against inadvertent rotation of the crank arm 526, preventing inadvertent spinning of the core shaft 34. In embodiments where the arm 560 is fixed to the post 548, the post 548 is biased to the storage position to minimize the chance of inadvertent manipulation of the post 548 and to lower the outer profile of the device 500.

When the operator wishes to release the tension in the straps 12, 14, the operator rotates the arm 560 from the locking position to the stowed position, either by directly manipulating the arm 560, or by manipulating the post 548 in embodiments were the two are fixed together. The arm 560 may be free to rotate to the stowed position due to clearance between the arm 560 and the notch 588, such that the crank arm 526 is free to rotate to ultimately drive the core shaft 34, or allow the core shaft 34 to rotate to release the tension in the first and second straps 12, 14.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A strap tensioning mechanism comprising:
   a frame comprising a first side wall that retains a ledge;
   a core shaft on the frame, configured to receive an end of a strap for restraining cargo;
   a drive shaft;
   a gear assembly comprising a worm and a worm gear that are driven by the drive shaft,
   the drive shaft operable to drive the gear assembly to thereby cause rotation of the core shaft; and
   a crank handle associated with the drive shaft, the crank handle having a body with a length projecting away from the drive shaft to a free end,
   the free end of the crank handle pivotably supporting an arm between an operating and a locking position, the arm configured to be in alignment with the ledge in the frame when in the locking position to prevent rotation of the crank handle and drive shaft.

2. The strap tensioning system of claim 1, wherein the frame further comprises a second side wall and a bottom wall between the first and second side walls, wherein the core shaft is supported by one or both of the first and second side walls and the gear assembly is disposed proximate the second side wall.

3. The strap tensioning system of claim 1, wherein the ledge is disposed proximate a notch defined from an upper surface of the first side wall.

4. The strap tensioning system of claim 3, wherein the ledge is defined from first and second opposed ledges with the notch disposed therebetween.

5. The strap tensioning system of claim 1, wherein the arm comprises a first portion configured to be grasped by a user to manually move the crank handle when in the operation position, and a second portion that is configured to be in alignment with the ledge when in the locking position.

6. The strap tensioning system of claim 5, wherein the first portion is disposed at a perpendicular or oblique angle with respect to the second portion.

7. The strap tensioning system of claim 5, wherein the second portion is disposed in parallel and proximate to the crank handle when in the operating position.

8. The strap tensioning system of claim 1, wherein the arm is biased into the locking position.

9. The strap tensioning system of claim 1, wherein the core shaft rotates about a first axis through the frame, and the drive shaft rotates about a second axis perpendicular to the first axis.

10. The strap tensioning system of claim 9, wherein an anchor post is provided on the frame and is configured to receive a second length of a flexible strap, wherein a third axis extends through the anchor post.

11. The strap tensioning system of claim 10, wherein the second axis resides approximately mid-way between the first and third axes.

12. The strap tensioning system of claim 2, wherein the second side wall is formed from a flat piece bent to define a tab for supporting the drive shaft and through which the drive shaft extends.

13. The strap tensioning system of claim 2, wherein the first side wall, the bottom wall, and the second side wall are made from a single piece of formed flat metal stock.

14. The strap tensioning system of claim 13, wherein the single piece of flat metal stock is bent to define spaced tabs to define the ledge.

15. The strap tensioning system of claim 1, further comprising a lock assembly having on and off states and at least one lock component and with the lock assembly in the on state the at least one lock component interacts with the worm gear to block movement of the worm gear.

16. The strap tensioning system of claim 2, further comprising a cup-shaped cover component that cooperates with one of the side walls to define a chamber for at least a part of the gear assembly.

17. The strap tensioning system of claim 1, further comprising a first elongate flexible strap with a first end fixed to the core shaft, and an opposite end extending from the core shaft, wherein rotation of the core shaft causes the first flexible strap to wrap around the core shaft to change a free length of the flexible strap.

18. The strap tensioning system of claim 17, further comprising an anchor post mounted upon the frame in parallel to the core shaft, wherein the anchor post receives a first end of a second elongate flexible strap, wherein second elongate flexible strap extends to a second end that extends from the frame.

* * * * *